UNITED STATES PATENT OFFICE.

LIVINGSTON GIFFORD, OF JERSEY CITY, NEW JERSEY, ADMINISTRATOR OF KARL HEUMANN, DECEASED, ASSIGNOR TO THE BADISCHE ANILIN AND SODA FABRIK, OF LUDWIGSHAFEN, GERMANY.

BLUE COLORING-MATTER AND PROCESS OF MANUFACTURING SAME.

SPECIFICATION forming part of Letters Patent No. 622,139, dated March 28, 1899.

Application filed December 16, 1897. Serial No. 662,221. (Specimens.)

*To all whom it may concern:*

Be it known that KARL HEUMANN, deceased, late of Zurich, Switzerland, did invent a new and useful Improvement in Blue Coloring-Matter and Process of Manufacturing the Same, of which the following is a specification, and for which patents have been obtained in the following countries: Germany, No. 54,626, dated May 6, 1890; England, No. 8,726, dated June 5, 1890; France, No. 206,567, dated June 23, 1890; Belgium, No. 91,156, dated July 15, 1890; Italy, XXIV, 27,841, LIV, 453, dated September 30, 1890; Austria, Tom. 40, Fol. 3,505, dated November 29, 1890; Hungary, XXIV, 3,425, dated November 29, 1890; Russia, No. 7,250, dated June 27, 1892, and Spain, No. 11,005, dated August 21, 1890.

This invention is based upon the discovery that phenyl-glycocol can be converted into a useful blue coloring-matter by melting with a caustic alkali and subsequently oxidizing the product, which has the character of a leuco-compound.

The following is an example of the manner in which the invention can best be carried into effect. The parts are by weight: One (1) part of phenyl-glycocol (which can be obtained, as is well known, from mono-chloracetic acid and anilin) (*Berichte der Deutschen Chemischen Gesellschaft*, Vol. 10, p. 2046) is mixed with about two (2) parts of dry caustic potash and the mixture heated in a retort to a temperature of about two hundred and sixty degrees centigrade (260° C.) or higher. According as the amount of the leuco-compound increases the melt assumes a deep orange color, so that the appearance of the mass serves as a guide in telling when the operation is completed. When finished, the entire melt is allowed to cool and is then dissolved in water. A stream of air is passed through this solution and the precipitate formed is filtered, washed with water, then with very dilute hydrochloric acid, and finally with alcohol. The residual blue dyestuff is then dried.

The proportions and the temperature above prescribed may be varied considerably without materially altering the nature of the result. Also instead of phenyl-glycocol, its salts, ethers, or anhydride, (known as diphenyl-diketo-piperazin or as diphenyl-diacipiperazin,) (*Berichte der Deutschen Chemischen Gesellschaft*, Vol. 10, p. 1967; Vol. 16, p. 1040; Vol. 21, pp. 1258, 1665; Vol. 22, p. 1777,) also amido and substituted amido-derivatives, such as its anilid, can be used, when the result is similar. Caustic soda or a mixture of caustic soda and caustic potash act in the same way as does caustic potash itself. Also other oxidizing agents besides the air can be used in the final operation.

The above-mentioned leuco compound is of an orange color and gives a yellowish solution in water, which on exposure to the air or on oxydation by some other reagent yields the dyestuff.

The above-mentioned dyestuff when dried is a deep blue to greenish powder, giving a lustrous bronze-like streak on rubbing; it is insoluble in water; it is somewhat soluble in alcohol and gives on boiling an intensely blue solution; it is sufficiently soluble in ether, benzene, and glacial acetic acid to yield blue-colored solutions; it is slightly soluble in anilin in the cold, more soluble on boiling, and the solution is blue green in color. In the form of its sulfo acids it is soluble in water.

What is claimed is—

1. As an article of manufacture, the hereinbefore-described blue dyestuff which can be produced from phenyl-glycocol, and which in its unsulfonated form is insoluble in water, and in alcohol gives a solution which becomes intensely blue on boiling, and is sufficiently soluble in ether, benzene and glacial acetic acid to yield blue-colored solutions, and in anilin is slightly soluble in the cold and more soluble on boiling, and which dyestuff in its sulfonated form is soluble in water.

2. The herein-described process of manufacturing a dyestuff which consists in melting a phenyl-glycocol body with alkali, and subsequent oxydation by a blast of air or similar means, substantially as described.

3. The process of manufacturing a leuco compound which consists in melting a phenyl-glycocol body with alkali, substantially as described.

LIVINGSTON GIFFORD,
*Administrator of the estate of Karl Heumann, deceased.*

Witnesses:
M. WILSON,
C. RATHJEN.